United States Patent [19]

Kemp

[11] Patent Number: 4,861,173
[45] Date of Patent: Aug. 29, 1989

[54] BEARING LOCKING APPARATUS
[75] Inventor: Norman H. Kemp, Hurst, Tex.
[73] Assignee: Advanced Graphics Technology, Inc., Grapevine, Tex.
[21] Appl. No.: 147,937
[22] Filed: Jan. 25, 1988

Related U.S. Application Data

[63] Continuation-in-part of Ser. No. 86,697, Aug. 17, 1987, abandoned.

[51] Int. Cl.⁴ .............................................. F16C 43/00
[52] U.S. Cl. ................................... 384/538; 384/295; 384/541; 384/585; 403/362; 403/375
[58] Field of Search ............... 384/280, 281, 295, 418, 384/419, 428, 537, 538, 541, 542, 559, 562, 584, 585, 626; 403/362, 375, 354, 373

[56] References Cited

U.S. PATENT DOCUMENTS

| | | | |
|---|---|---|---|
| 2,279,593 | 4/1942 | Myers | 403/375 |
| 2,305,345 | 12/1942 | Hunter | 403/362 |
| 3,338,602 | 8/1967 | Arnd | 403/362 X |
| 4,104,000 | 8/1978 | Fleischmann | 403/373 X |
| 4,531,847 | 7/1985 | F'Geppert | 384/626 X |
| 4,676,672 | 6/1987 | Tufty | 384/585 X |

FOREIGN PATENT DOCUMENTS

| | | | |
|---|---|---|---|
| 1446907 | 6/1966 | France | 384/585 |
| 0294667 | 7/1928 | United Kingdom | 384/537 |

Primary Examiner—Thomas R. Hannon
Attorney, Agent, or Firm—Kanz, Scherback & Timmons

[57] ABSTRACT

Disclosed are methods and apparatus for controllably locking a shaft to a bearing surface moveable thereupon to permit or prevent axial movement of the bearing with respect to the shaft. In one embodiment an axially extending flap is formed in the shaft which is activated by a wedge to expand the diameter of the shaft and thereby lock the shaft to the surrounding bearing surface. In another embodiment a slot is formed in the bushing surrounding the shaft and the internal diameter of the bushing decreased with a wedge screw to lock the bushing to the shaft.

16 Claims, 1 Drawing Sheet

BEARING LOCKING APPARATUS

This is a continuation-in-part of application Ser. No. 07/086,697 filed Aug. 17, 1987 entitled Bearing Locking Apparatus, now abandoned.

This invention relates to apparatus for releaseably locking a bearing surface to a shaft. More particularly, it relates to methods and apparatus for controlling axial movement of a bearing surface along the length of a shaft.

The following disclosure is offered for public dissemination in return for grant of a patent. Although it is sufficiently detailed to provide full understanding of the principles of the invention, this disclosure is not intended to prejudice the purpose of a patent which is to protect each new inventive concept therein no matter how others may later disguise it by variations in form, additions or further improvements.

Various mechanical apparatus employ a shaft rotating in a bearing or a bearing rotating about a shaft. For purposes of this disclosure, the relative rotation of bearing and shaft will be referred to as a bearing rotating about a shaft regardless of whether either the shaft or the bearing is fixed. In many instances, the axial position of the bearing on the shaft is fixed. In other instances, the bearing may rotate about the shaft as well as move axially along the shaft. In still other cases, it is necessary that axial movement of the bearing surface along the shaft be permitted but controlled. This invention has particular application in the latter case. While it will be readily recognized that the locking arrangement of this invention may be applicable for many various apparatus, it will be described herein with particular reference to mounting of form rollers in a printing press where it finds particular application.

In the conventional lithograph printing press ink is distributed from an ink supply via a distribution roller to a vibrating roller and then to a form roller which transfers the ink directly to the printing plate. Each roller is mounted horizontally on a shaft with the periphery of the distribution roller contacting the vibrating roller; the vibrating roller contacting the form roller; and the form roller directly contacting the printing plate. Each roller may rotate about its shaft or be fixed to the shaft with the ends of the shafts mounted in appropriate bearing housings The axial position of each roller with respect its shaft is usually fixed. However, to ensure adequate distribution of ink to the form roller, the vibrating roller oscillates axially along its shaft while rotating.

When printing full ink borders around large open spaces, a problem known as ghosting is commonly encountered. Ghosting is primarily a problem of uneven ink distribution in the full ink area immediately following the open space and is the result of ink accumulation and starvation occurring at the printing plate itself. In order to solve this problem, some printing presses have been modified to permit the form roller to vibrate as well as the vibrating roller. Axial movement of the form roller solves the ghosting problem, but may cause excessive wear on the form roller surface as well as the printing plate. For this reason and others it is desirable to permit the form roller to vibrate in some situations but to be locked in a fixed axial position for other printing jobs.

According to the present invention, a locking mechanism is provided to selectively permit the form roller to oscillate on its shaft or to be locked in a fixed axial position. Since downtime time for a press is very expensive, modification from oscillation to fixed position and vice versa must be accomplished with a minimum amount of downtime. Furthermore, working space is at a premium. Accordingly, any modification mechanism must occupy as little space as possible yet be convenient to the operator to make rapid modifications in the operating conditions of the press.

Where the shaft is fixed and the form roller rotates thereabout on bearings with an outer race supporting the roller and an inner race surrounding the shaft, axial movement along the shaft can be permitted by allowing the inner race to move axially over the shaft. In accordance with one embodiment of the invention, a locking mechanism is provided by forming a radial cut in the shaft which extends from one surface of the shaft toward the center thereof. An axial cut is then formed in the shaft which runs essentially parallel with the axis of the shaft and intersects the radial cut to form an axially extending flap having a free end. Wedging means such as a screw or the like passing through the shaft opposite the free end of the flap may then be used to spread the flap outwardly from the axis of the shaft when the bearing inner race is adjacent the flap, thereby expanding the diameter of the shaft sufficiently to lock the bearing race in place. In this condition the roller may continue to rotate about the shaft but may not move axially along the shaft.

Where the inner race of the bearing rides on a bushing disposed between the inner race of the bearing and the shaft, a similar effect may be accomplished by forming an axial split in one end of the bushing. Wedging means such as a screw or the like passing through the inner race may then be adjusted to wedge the bushing against the shaft and mechanically lock the axial position of the bearing on the shaft.

It will be readily recognized that the mechanism of this invention may be precisely and inexpensively formed and included in various shaft and bearing mechanisms. The locking mechanism occupies essentially no additional space and only requires a simple screw adjustment to activate and deactivate. It is therefore readily applicable and highly useful in assemblies which require rapid modification with minimum downtime while minimizing the physical space required for the locking mechanism. Furthermore, since the invention causes an expansion of the diameter of the shaft or a reduction of the inner cross-sectional area of the shaft opening in a bushing, the interlocked bearing surfaces are relatively large area surfaces. Thus the mating bearing surfaces cannot be marred or deformed by activation or deactivation of the locking mechanism.

Other features and advantages of the invention will become more readily understood when taken in connection with the attached claims and appended drawing wherein:

Figure 1:
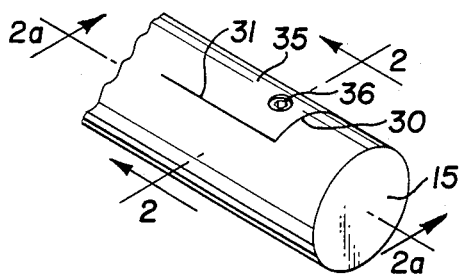
FIG. 1 is a perspective view of a shaft incorporating the locking flap mechanism of the invention.
Figure 2:
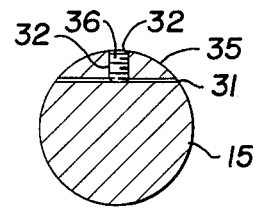
FIG. 2 is a cross-sectional view of the shaft of FIG. 1 taken through line 2—2.
Figure 2A:
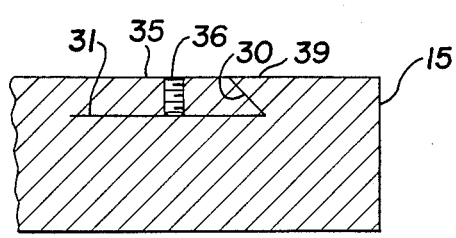
FIG. 2a is a cross-sectional view of the shaft of FIG. 1 taken along line 2a–2a showing the position of the locking flap when not in use.
Figure 2B:
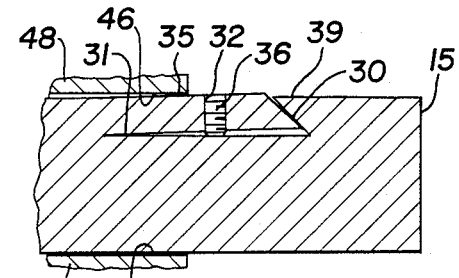
Figure 3:
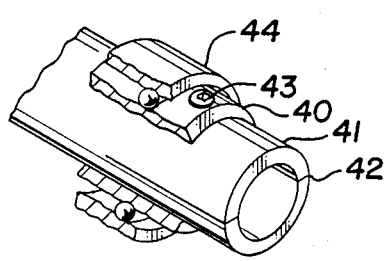
Figure 4:
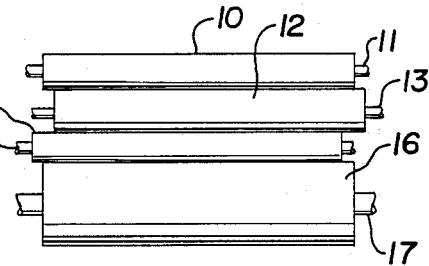
Figure 5:
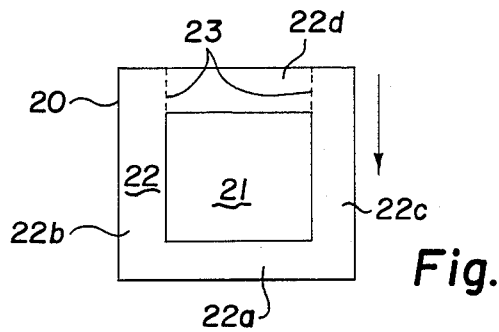

FIG. 2b (is a cross-sectional view of the shaft of FIG. 1 taken through line 2b–2b showing the position of the locking flap when in use;

FIG. 3 is a perspective view, partially broken away, illustrating the split bushing embodiment of the invention;

FIG. 4 is a schematic illustration of the arrangement of ink transfer rollers in a conventional lithograph printing press; and FIG. 5 is a pictorial illustration of the ghosting problem which occurs as a result of ink depletion and accumulation.

While it will be readily recognized that the apparatus described and claimed herein will find utility in other mechanisms, it is described herein with particular reference to lithographic printing presses, the ink distribution mechanism of which is schematically illustrated in FIG. 4.

In a conventional press the ink is supplied to a distribution roller 10 mounted for rotation about a horizontal shaft 11. The ink is transfered from the distribution roller 10 to a vibrating roller 12 which rotates about shaft 13 and also moves axially with respect to shaft 13 to aid in distribution of the ink. The ink is then transfered to the form roller 14 which rotates about shaft 15. The ink is transferred from the form roller 14 directly to the printing plate of cylinder 16 which rotates about shaft 17.

FIG. 5 illustrates the uneven ink distribution problem known as ghosting. As a sheet 20 moves through the printing press in the direction of the arrow to have an image printed thereon which includes a blank space 21 surrounded by a solid border 22, the ink is evenly applied to the leading border 22a and the edge borders 22b and 22c. However, when the trailing border 22d is printed the density of ink supplied to border 22d is usually greater than the ink supplied to the trailing edges of side borders 22b and 22c because of ink accumulation at the center of the form roller 14 and ink depletion or starvation at the edges thereof. Thus a discontinuity in ink density occurs across dashed lines 23. The discontinuity in ink distribution is not noticeable when small open spaces are involved. However, when large borders of bright or dark colors are printed around large open spaces, ghosting becomes an obvious problem which seriously degrades the quality of appearance of the printed material.

It has been discovered that the ghosting problem can be alleviated by causing the form roller to oscillate axially as well as the vibrating roller. When the form roller oscillates, precise ink distribution is accomplished and ink discontinuity problems such as described above are totally eliminated. However, oscillation or vibration (axially movement of the form roller) can have a deleterious effect on both the form roller and the printing plate. Accordingly, it is not desirable that the form roller oscillate in all instances. Instead, oscillation of the form roller should be limited to those cases wherein ghosting is likely to be a problem. It is therefore highly desirable that the printing press be adapted to permit the form roller to vibrate only when required and that the modification from fixed axial location to vibratory motion of the form roller (and vice versa) be accomplished rapidly so that downtime of the press is minimized.

One preferred embodiment of the invention is illustrated in FIGS. 1 and 2 wherein a radial cut 30 is formed in shaft 15 to a depth less than one-half the diameter of the shaft. Preferably, the depth of the radial cut is about one-fifth to one-third of the diameter of the shaft. An axial cut 31 is then formed in the shaft in a plane parallel with the axis thereof which terminates at the radial cut 30. The two cuts thus form a flap 35 in the shaft. The flap 35 is preferably formed at the axial location on the shaft where the bearing supporting the roller is to be fixed when the roller is to operate at a fixed axial location.

In most cases the form roller rotates about a bushing which may rotate about or move axially along the surface of the shaft 15. The axial position of the roller with respect to the bushing is fixed. However, the roller may rotate about the bushing. The axial position of the bushing with respect to the shaft, however, is not fixed. Thus the bushing may rotate about the shaft as well as move axially along the shaft. In this condition, the form roller may rotate as well as vibrate axially along the length of the shaft. In order to fix the axial position of the roller with respect to the shaft, a hole 32 is formed in the flap 35 near the free end thereof. The hole is internally threaded to mate with the threads of a set screw 36 or the like which has a length shorter than the depth of the hole 32. It will thus be realized that by advancing the set screw 36 into the hole 32, the end of the screw will contact the shaft 15 at cut 31. As the screw 36 is advanced further into the hole, the screw acts as a wedge to spread flap 35 from the axis of the shaft 15, thus effectively increasing the diameter of the shaft. If the inner race of the bearing or the inner surface 46 of a bushing 48 is surrounding the shaft in the area of the flap 35 as shown in FIG. 2b, enlarging the diameter of the shaft as described it will lock the bushing or bearing in place to prevent rotation thereabout and axial movement along the length of the shaft. Thus, by simply adjusting the screw 36 the axial location of the bearing rotating thereabout can be determined. However, by releasing the screw 36 the flap 35 returns to its original position and the bearing surface may move radially and axially thereover. Thus the invention as described with respect to FIGS. 1 and 2 may be used to accomplish all the desired results set forth hereinabove. For example, by relaxing the screw 36 the form roller may move axially as well as radially around the shaft 15. However, to lock the axial position of the roller the roller is moved to the desired axial position and locked therein by simply advancing the screw 36 sufficiently to expand the shaft and lock the axial position of the inner race of the bearing or a bushing rotating thereabout. Obviously, the locking mechanism requires very little access space and, since the modification may be formed so rapidly, minimizes downtime of the operating equipment.

It will be readily apparent that the set screw could be positioned in a hole in the portion of shaft 15 opposite the flap 35 and accomplish identical results. In either case, however, the length of the screw 36 must be less than the depth of the hole so that the bearing race or bushing may move axially over and rotate freely about the shaft when the flap 35 is released.

It should also be noted that the screw 36 never contacts a bearing surface. Instead, the screw 36 causes the diameter of the shaft to expand, thus causing a friction lock between large surface areas of the shaft and bearing. Accordingly, activation of the locking mechanism can cause no scratching or other damage to a bearing surface.

As described above and as illustrated in FIG. 1, cut 30 lies in a plane normal to the axis of shaft 15. The end of flap 35 is thus free and, if care is not exercised in extending the flap 35 to expand the effective diameter of the shaft, the flap 35 may be extended so far as to deform the flap and cause it to become permanently extended. To avoid this potential problem, it is preferred that the radial cut 30 be formed in a plane which is inclined with respect to the axis of the shaft 15 as illustrated in FIGS. 2a and 2b. When the cut 30 is inclined with respect to the shaft with its entry disposed toward the fixed end of the flap, the free end of the flap is trapped beneath a ledge 39. Thus the radial distance which the free end of the flap 35 may move is limited by the width of cut 30.

It will be recognized that the radial distance which the free end of the flap may move is limited by the inclination and angle of the radial cut 30 and the width of cut 30. These parameters may, of course, be varied as desired. However, so long as these parameters are controlled so that the free end of the flap 35 is trapped below the ledge 39, the flap 35 cannot be accidentally extended sufficiently to cause permanent deformation.

An alternative form of the invention is illustrated in FIG. 3 wherein the inner race 40 of a bearing is positioned over a bushing 41 which moves axially over a shaft (not shown). In order to lock the axial position of the bearing, a axial cut 42 is formed in the bushing and a hole drilled in the inner race 40 of the bearing. A set screw 43 or the like is positioned within the hole in the inner race 40. In the relaxed position, the bushing 42 may move axially over the shaft while the roller rotates radially about the shaft assembly on outer race 44. However, to fix the axial position of the roller set screw 43 is advanced into the inner race 40 sufficiently to contact bushing 41 and compress bushing 41 against the shaft (not shown). When the bushing 41 is sufficiently compressed, its position with respect to the shaft (not shown) is axially fixed, thus the roller may not move axially but still may rotate about the assembly on outer race 44. As noted above, locking is formed by friction engagement between relatively large areas of shaft and bushing. The screw does not contact a bearing surface. Thus no damage can be caused to the bearing surfaces by activation of the locking mechanism. When the locking mechanism is released, the bearing, shaft and bushing operate normally.

In some cases the shaft rotates in bearings at the ends thereof and is surrounded by a bushing so that the roller may move axially when the bushing is fixed to the roller. In such cases, the bushing may be slotted as described above and the screw pass directly through the roller to compress the slotted bushing.

The cuts 30 and 31 formed in the shaft should be, of course, of minimum width and length to avoid abrupt edges and to avoid detrimental effects to the structural strength of the shaft. Since the flap 35 need only move outwardly, the cuts should be as thin as possible.

In the preferred method of forming cuts 30 and 31, the cuts are formed with a wire cut electrical discharge machine wherein a thin wire is used as an electrical discharge source and drawn through the shaft to form an electrical discharge cut. Using this method, cuts as narrow as 0.005 inch can be uniformly formed with relative ease. Furthermore, this process permits forming the radial cuts 31 at any desired locations along the length of the shaft. Obviously, the radial cut and the axial cut may be formed in a single cutting motion and the radial cut need not be perfectly radial. It may, in fact be a curved cut and/or may be inclined with respect to the axis of the shaft as described above.

The axial cuts 42 in the bushings can, of course, be formed by the same process. However, the cuts 42 may be slightly wider to permit sufficient radial compression to lock the shaft passing therethrough. Since the clearance between the outside diameter of the shaft and the inside diameter of the bushing is normally ±0.001 inch, cuts 42 as thin as 0.0001 inch and as wide as 0.010 inch are acceptable. Such cuts can be formed, of course, by fine saws and other techniques.

From the foregoing it will be observed that the locking mechanism of the invention can be formed using conventional materials and equipment. Furthermore, since the invention requires modification of standard parts prior to assembly thereof by forming holes, slots and cuts therein, the apparatus of the invention, when functional, dds little more to the complexity and mass of the assembly than the addition of a set screw or the like. Accordingly, the invention can be used in apparatus where working space is at a premium without interfering with other working parts. Since the locking mechanism is activated and deactivated merely by advancing or retracting a single screw, downtime of the apparatus for conversion is maintained at a minimum.

It will be readily recognized that the principles of the invention may be readily applied to mechanisms other than those disclosed in detail and that the various parts thereof can be reversed and otherwise rearranged to accomplish the same or similar results. Accordingly, while the invention has been described with particular reference to specific embodiments thereof, the forms of the invention shown and described in detail are to be taken as preferred embodiments of same. Various changes and modifications may be resorted to without departing from the spirit and scope of the invention as defined by the appended claims.

What is claimed:

1. Apparatus comprising an elongated shaft and a bearing surface surrounding said shaft adapted for relative movement between said shaft and said bearing surface including locking means to prevent relative movement between said bearing surface and said shaft comprising:
   (a) a radial cut in said shaft between the ends thereof extending from one surface toward the center of said shaft having a radial depth of less than one-half the diameter of said shaft;
   (b) an axial cut in said shaft substantially parallel with the axis of said shaft extending through the shaft in a plane which intersects the surface of said shaft at two radial points and which intersects said radial cut, thereby forming an axial flap having a free end; and
   (c) wedge means movable radially with respect to said shaft for spreading the free end of said flap away from the axis of said shaft.

2. Apparatus as defined in claim 1 wherein the bearing surface adjacent the shaft is the inner race of a bearing.

3. Apparatus as defined in claim 1 wherein the depth of said radial cut is between about one-fifth and one-third the diameter of said shaft.

4. Apparatus as defined in claim 1 wherein the bearing surface adjacent the shaft is the inner surface of a bushing. passing through said flap.

5. Apparatus comprising a solid elongated shaft and a bearing surface surrounding said shaft adapted for relative movement between said shaft and said bearing surface including locking means to prevent relative movement between said bearing surface and said shaft comprising:

(a) a radial cut in said shaft between the ends thereof extending from one surface toward the center of said shaft having a radial depth of less than one-half the diameter of said shaft;

(b) an axial cut in said shaft substantially parallel with the axis of said shaft extending through the shaft in a plane which intersects the surface of said shaft at two radial points and which intersects said radial cut, thereby forming an axial flap having a free end; and (c) wedge means for spreading the free end of said flap away from the axis of said shaft.

6. Apparatus as defined in claim 5 wherein the bearing surface adjacent the shaft is the inner race of a bearing.

7. Apparatus as defined in claim 5 wherein the depth of said radial cut is between about one-fifth and one-third the diameter of said shaft.

8. Apparatus as defined in claim 5 wherein said wedge means comprises a screw threadedly mounted in a radially extending hole passing through said flap.

9. Apparatus as defined in claim 5 wherein said wedge means comprises a screw threadedly mounted in a radially extending hole passing through said shaft adjacent the free end of said flap.

10. Apparatus as defined in claim 5 wherein the bearing surface adjacent the shaft is the inner surface of a bushing.

11. Apparatus as defined in claim 5 wherein said radial cut lies in a plane inclined with respect to the axis of said shaft.

12. Apparatus as defined in claim 5 wherein said radial cut forms a ledge in the shaft extending over the free end of said flap.

13. Apparatus comprising an elongated shaft and a bearing surface surrounding said shaft adapted for relative movement between said shaft and said bearing surface including locking means to prevent relative movement between said bearing surface and said shaft comprising:

(a) a radial cut in said shaft between the ends thereof extending from one surface toward the center of said shaft having a radial depth of less than one-half the diameter of said shaft;

(b) an axial cut in said shaft substantially parallel with the axis of said shaft extending through the shaft in a plane which intersects the surface of said shaft at two radial points and which intersects said radial cut, thereby forming an axial flap having a free end; and (c) a screw threadedly mounted in a radially extending hole passing through said flap for spreading the free end of said flap away from the axis of said shaft.

14. Apparatus comprising an elongated shaft and a bearing surface surrounding said shaft adapted for relative movement between said shaft and said bearing surface including locking means to prevent relative movement between said bearing surface and said shaft comprising:

(a) a radial cut in said shaft between the ends thereof extending from one surface toward the center of said shaft having a radial depth of less than one-half the diameter of said shaft;

(b) an axial cut in said shaft substantially parallel with the axis of said shaft extending through the shaft in a plane which intersects the surface of said shaft at two radial points and which intersects said radial cut, thereby forming an axial flap having a free end; and (c) a screw threadedly mounted in a radially extending hole passing through said shaft adjacent the free end of said flap for spreading the free end of said flap away from the axis of said shaft.

15. Apparatus comprising an elongated shaft and a bearing surface surrounding said shaft adapted for relative movement between said shaft and said bearing surface including locking means to prevent relative movement between said bearing surface and said shaft comprising:

(a) a radial cut in said shaft between the ends thereof extending from one surface toward the center of said shaft having a radial depth of less than one-half the diameter of said shaft, wherein said radial cut lies in a plane inclined with respect to the axis of said shaft;

(b) an axial cut in said shaft substantially parallel with the axis of said shaft extending through the shaft in a plane which intersects the surface of said shaft at two radial points and which intersects said radial cut, thereby forming an axial flap having a free end; and (c) wedge means for spreading the free end of said flap away form the axis of said shaft.

16. Apparatus comprising an elongated shaft and a bearing surface surrounding said shaft adapted for relative movement between said shaft and said bearing surface including locking means to prevent relative movement between said bearing surface and said shaft comprising:

(a) a radial cut in said shaft between the ends thereof extending from one surface toward the center of said shaft having a radial depth of less than one-half the diameter of said shaft;

(b) an axial cut in said shaft substantially parallel with the axis of said shaft extending through the shaft in a plane which intersects the surface of said shaft at two radial points and which intersects said radial cut, thereby forming an axial flap having a free end, wherein said radial cut form a ledge in the shaft extending over the free end of said flap; and (c) wedge means for spreading the free end of said flap away from the axis of said shaft.

* * * * *

UNITED STATES PATENT AND TRADEMARK OFFICE
CERTIFICATE OF CORRECTION

PATENT NO.  : 4,861,173
DATED       : August 29, 1989
INVENTOR(S) : Norman H. Kemp It is certified that error appears in the above-identified patent and that said Letters Patent is hereby corrected as shown below:

Column 2, line 66, "(" should be deleted

Column 6, line 13, "dds" should read ---adds---

Column 6, line 62, "passing through said flap." should be deleted---

Column 8, line 37, "form" should read ---from---

Signed and Sealed this

Nineteenth Day of June, 1990

*Attest:*

HARRY F. MANBECK, JR.

*Attesting Officer*    *Commissioner of Patents and Trademarks*